United States Patent
Yamada et al.

(10) Patent No.: US 12,208,446 B2
(45) Date of Patent: Jan. 28, 2025

(54) POWDER MATERIAL FOR USE IN ADDITIVE LAYER MANUFACTURING, ADDITIVE LAYER MANUFACTURING METHOD USING SAME, AND MOLDED ARTICLE

(71) Applicant: FUJIMI INCORPORATED, Kiyosu (JP)

(72) Inventors: Junya Yamada, Kiyosu (JP); Hiroyuki Ibe, Kiyosu (JP); Nobuaki Kato, Kiyosu (JP); Yuta Kato, Kiyosu (JP); Yoshikazu Sugiyama, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 363 days.

(21) Appl. No.: 17/292,806

(22) PCT Filed: Nov. 8, 2019

(86) PCT No.: PCT/JP2019/043950
§ 371 (c)(1),
(2) Date: May 11, 2021

(87) PCT Pub. No.: WO2020/100756
PCT Pub. Date: May 22, 2020

(65) Prior Publication Data
US 2021/0395860 A1    Dec. 23, 2021

(30) Foreign Application Priority Data

Nov. 12, 2018    (JP) ................... 2018-212472

(51) Int. Cl.
*B22F 1/05*    (2022.01)
*B22F 1/052*    (2022.01)
(Continued)

(52) U.S. Cl.
CPC ............... *B22F 1/05* (2022.01); *B22F 1/052* (2022.01); *B33Y 70/10* (2020.01); *C22C 1/051* (2013.01);
(Continued)

(58) Field of Classification Search
None
See application file for complete search history.

(56) References Cited

U.S. PATENT DOCUMENTS

| 5,204,055 A | 4/1993 | Sachs et al. |
| 5,340,656 A | 8/1994 | Sachs et al. |

(Continued)

FOREIGN PATENT DOCUMENTS

| CN | 106709180 A | 5/2017 |
| JP | H06-218712 A | 8/1994 |

(Continued)

OTHER PUBLICATIONS

Extended European Search Report issued in corresponding European Application No. 19884497.9 dated Nov. 16, 2021.

(Continued)

*Primary Examiner* — Seth Dumbris
(74) *Attorney, Agent, or Firm* — Foley & Lardner LLP

(57) ABSTRACT

There is provided a powder material that is for densifying a molded article manufactured by an additive layer manufacturing method and improving harness of the molded article. There is provided a powder material for use in additive layer manufacturing containing ceramics and metals, in which a tapped filling rate defined by (tapped density/theoretical density)×100% is 40% or more.

5 Claims, 1 Drawing Sheet

(51) Int. Cl.
  *B33Y 70/10* (2020.01)
  *C22C 1/051* (2023.01)
  *C22C 29/00* (2006.01)
  *C22C 29/08* (2006.01)
  *B22F 1/10* (2022.01)
  *B22F 1/148* (2022.01)
  *B22F 10/28* (2021.01)
  *B33Y 10/00* (2015.01)

(52) U.S. Cl.
  CPC ............ *C22C 29/005* (2013.01); *C22C 29/08* (2013.01); *B22F 1/10* (2022.01); *B22F 1/148* (2022.01); *B22F 10/28* (2021.01); *B22F 2301/15* (2013.01); *B22F 2302/10* (2013.01); *B22F 2304/10* (2013.01); *B33Y 10/00* (2014.12); *Y10T 428/12014* (2015.01)

(56) References Cited

U.S. PATENT DOCUMENTS

| | | | |
|---|---|---|---|
| 5,387,380 A | 2/1995 | Cima et al. | |
| 5,807,437 A | 9/1998 | Sachs et al. | |
| 6,036,777 A | 3/2000 | Sachs | |
| 6,146,567 A | 11/2000 | Sachs et al. | |
| 2005/0150576 A1* | 7/2005 | Venigalla | B22F 1/145 148/284 |
| 2009/0214886 A1 | 8/2009 | Ishii et al. | |
| 2013/0071748 A1 | 3/2013 | Okada et al. | |
| 2013/0089749 A1* | 4/2013 | Slattery | B22F 3/15 419/38 |
| 2013/0341145 A1 | 12/2013 | Ueshima et al. | |
| 2014/0065194 A1 | 3/2014 | Yoo et al. | |
| 2015/0104666 A1 | 4/2015 | Kamimura et al. | |
| 2015/0183166 A1 | 7/2015 | Yoo et al. | |
| 2015/0321255 A1 | 11/2015 | Colin et al. | |
| 2016/0193787 A1 | 7/2016 | Yoo et al. | |
| 2016/0199948 A1 | 7/2016 | Kamimura et al. | |
| 2016/0207265 A1 | 7/2016 | Yoo et al. | |
| 2016/0368057 A1* | 12/2016 | Hopkins | B23K 26/342 |
| 2017/0072469 A1 | 3/2017 | Maderud et al. | |
| 2017/0151723 A1 | 6/2017 | Yoo et al. | |
| 2017/0189960 A1 | 7/2017 | Ibe | |
| 2017/0239726 A1 | 8/2017 | Palumbo et al. | |
| 2017/0326641 A1* | 11/2017 | Lee | B22F 3/16 |
| 2018/0147627 A1 | 5/2018 | Nakamura et al. | |
| 2018/0162042 A1 | 6/2018 | Yoo et al. | |
| 2018/0236687 A1* | 8/2018 | Prichard | C04B 35/5626 |
| 2018/0264715 A1 | 9/2018 | Yoo et al. | |
| 2018/0369909 A1 | 12/2018 | Ibe et al. | |
| 2019/0001556 A1 | 1/2019 | Ibe et al. | |
| 2019/0003019 A1 | 1/2019 | Ibe et al. | |
| 2019/0161837 A1 | 5/2019 | Maderud et al. | |
| 2019/0211424 A1 | 7/2019 | De Flon | |
| 2020/0001521 A1 | 1/2020 | Yoo et al. | |
| 2020/0360995 A1 | 11/2020 | Maderud et al. | |

FOREIGN PATENT DOCUMENTS

| | | | | |
|---|---|---|---|---|
| JP | 2003-245981 A | 9/2003 | | |
| JP | 2015-205512 A | 11/2015 | | |
| JP | 2017-113952 A | 6/2017 | | |
| JP | 2017-114716 A | 6/2017 | | |
| JP | 2017-115194 A | 6/2017 | | |
| JP | 2017-519101 A | 7/2017 | | |
| JP | 2018-090841 A | 6/2018 | | |
| JP | 2018-154905 A | 10/2018 | | |
| WO | WO-86/01196 A1 | 2/1986 | | |
| WO | WO-2015/194678 A1 | 12/2015 | | |
| WO | WO-2017110827 A1 * | 6/2017 | .............. | B22F 10/28 |
| WO | WO-2017/117527 A1 | 7/2017 | | |
| WO | WO-2017/178319 A1 | 10/2017 | | |
| WO | WO-2019177666 A1 * | 9/2019 | ............ | B22F 1/0011 |

OTHER PUBLICATIONS

Extended European Search Report issued in corresponding European Application No. 19884166.0 dated Nov. 16, 2021 (11 pages).
Höganäs, "Powders for Thermal Spraying", No. PD-4028, Issue 7-12. Dec. 2017, AMPERIT® 526 (4 pages) Retrieved from the Internet: URL: https://www.hoganas.com/globalassets/download-media/stc/pd-4028.pdf [retrieved on Nov. 5, 2021].
International Preliminary Report on Patentability for Appl. Ser. No. PCT/JP2019/041567 dated May 20, 2021 (9 pages).
Tomas et al., "Laser sintering of tungsten carbide cutter shafts with integrated cooling channels", Proceedings of the 3rd International Conference on Progress in Additive Manufacturing (Pro-AM 2018), 2018, (pp. 297-302) Retrieved from the Internet: URL:https://dr.ntu.edu.sg/bitstream/10356/88554/1/LASER%20SINTERING%20OF%20TUNGSTEN%20CARBIDE%20CUTTER%20SHAFTS%20WITH%20INTERGRATED%20COOLING%20CHANNELS.pdf[retrieved on Nov. 5, 2021].
US Non-Final Office Action on U.S. Appl. No. 17/292,795 dated Jan. 16, 2024 (13 pages).
English translation of CN 106709180 (originally published May 24, 1017), obtained from PE2E search.
English translation of JP 2017-113952 (originally published Jun. 29, 2017), obtained from PE2E search.
English translation of JP 2017-114716 (originally published Jun. 29, 2017), obtained from PE2E search.
English translation of JP 2017-115194 (originally published Jun. 29, 2017), obtained from PE2E search.
US Non-Final Office Action on U.S. Appl. No. 17/292,795 Dated Jul. 9, 2024 (9 pages).

\* cited by examiner

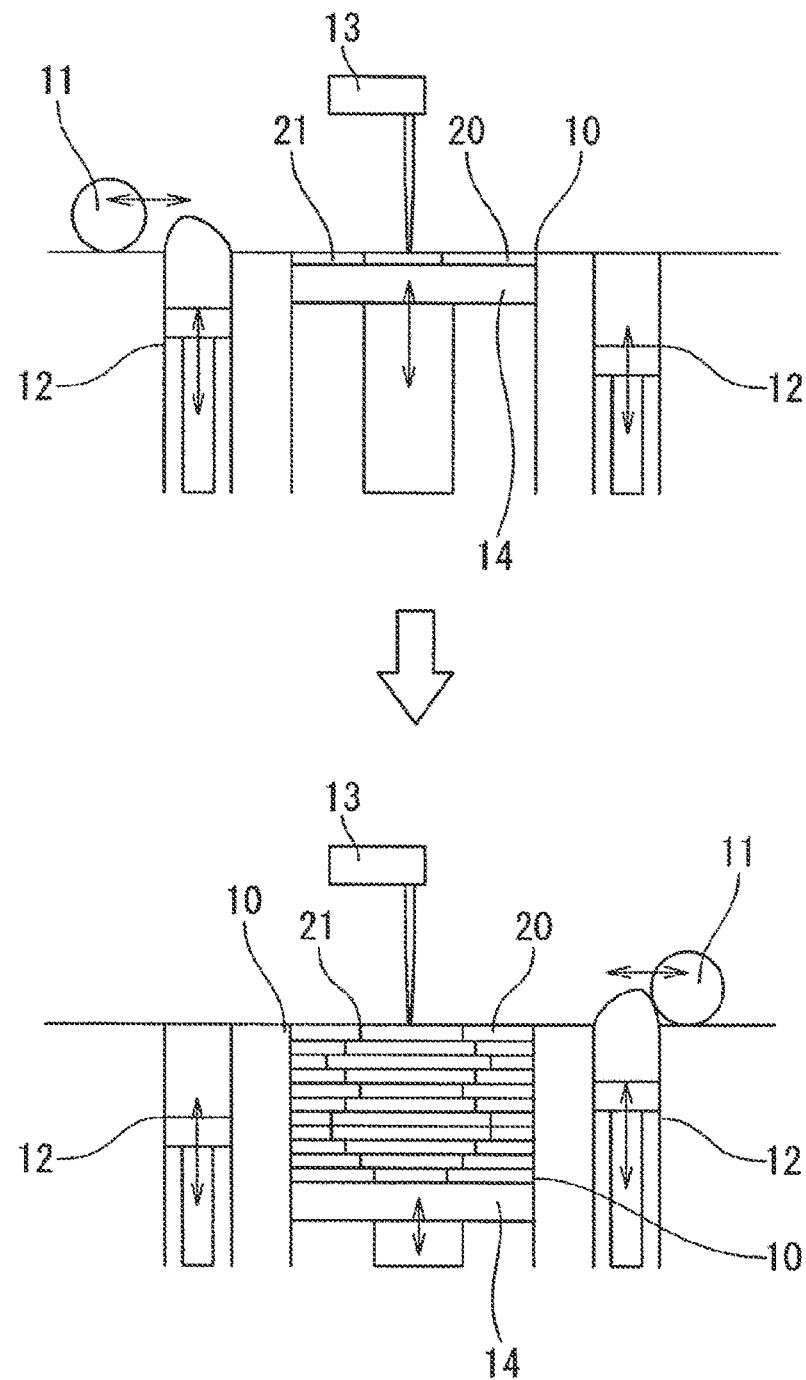

POWDER MATERIAL FOR USE IN ADDITIVE LAYER MANUFACTURING, ADDITIVE LAYER MANUFACTURING METHOD USING SAME, AND MOLDED ARTICLE

TECHNICAL FIELD

The present invention relates to a powder material for use in additive layer manufacturing, an additive layer manufacturing method using the same, and a molded article to be obtained.

BACKGROUND ART

An additive layer manufacturing method is a technique of molding a target three-dimensional shape by joining or sintering a powder material, which is used as a molding raw material, as a thin layer in a shape corresponding to a predetermined cross section of a molded article to be modeled, followed by sequentially laminating. This technique does not require a forming die, and thus has an advantage that a three-dimensional molded article as a shape model or the like can be quickly and easily obtained. In this additive layer manufacturing method, a technique of forming a thin layer from a powder material is roughly classified into two systems.

One of the systems is a beam irradiation system of depositing a powder material in a thin layer shape, and then emitting abeam (directional energy beam, e.g., laser) or the like as a heat source in a target cross-sectional shape to sinter powder particles to form a sintered layer (e.g., see PTL 1). The beam irradiation system includes a selective laser melting method, an electron beam melting method, and the like, depending on the type of the beam as the heat source.

The other system is an inkjet system of depositing a powder material in a thin layer shape, and then jetting a binder (bonding agent) to the deposited layer by inkjet in a target cross-sectional shape to join powder particles to form a joint layer (e.g., see PTL 2).

In a conventional additive layer manufacturing method, a powder material containing a resin material has been used due to its good fusion-bonding ability by the heat source and joinability by the binder described above. The resin material is lightweight and readily gives a spherical powder, and thus readily prepares a homogeneous powder material having relatively good fluidity. In recent years, however, there has been an increasing demand for directly producing more practical prototypes and products utilizing the additive layer manufacturing method. Therefore, the production of a molded article which is placed in a high temperature environment or which is required to have high strength has required the supply of a powder material for additive layer manufacturing containing a metal material or a ceramic material in addition to the resin material.

Thus, for example, PTLs 3 and 4 propose a molding material for use in additive layer manufacturing containing granulated sintered particles in which a first powder containing ceramics and a second powder containing metals are bonded by sintering. Further, PTL 5 proposes a molding material for use in additive layer manufacturing, which is a powder material containing metals and/or ceramics and has a form of secondary particles in which primary particles are three-dimensionally bonded with gaps.

However, in these molding materials for use in additive layer manufacturing, the particle diameter and the specific gravity of the powder particles are relatively uniformized but a molded article to be obtained by the additive layer manufacturing method is not sufficiently densified. Therefore, there has been a problem that only insufficient hardness is obtained in manufacturing of products which are required to have hardness, such as tools or dies containing cermets or cemented carbides.

CITATION LIST

Patent Literature

PTL 1: JP 2003-245981 A
PTL 2: JP H06-218712 A
PTL 3: JP 2017-113952 A
PTL 4: JP 2017-114716 A
PTL 5: WO 2015/194678A

SUMMARY OF INVENTION

Technical Problem

The present invention has been made in view of the above-described points. It is an object of the present invention to provide a powder material that is for densifying a molded article manufactured by an additive layer manufacturing method and increasing the hardness of the molded article.

Solution to Problem

To solve the above-described problem, a technology disclosed herein provides a powder material containing ceramics and metals. Such a powder material provides a powder material for molding which is a powder material for use in additive layer manufacturing and has a tapped filling rate, which is defined by (tapped density/theoretical density)× 100%, of 40% or more. Thus, it can be expected that a powder material having high relative density is obtained, and a material obtained by the additive layer manufacturing is densified and has improved hardness.

When the tapped filling rate (%), which is the ratio of the tapped density to the theoretical density, is higher, the relative density of the powder material tends to be higher. When the tapped filling rate is 40% or more, the relative density increases and the hardness of a molded article obtained by the additive layer manufacturing is remarkably improved.

The tapped density is the bulk density obtained when a measuring graduated cylinder or vessel containing a powder sample is mechanically tapped and the volume of the sample does not change. In the present specification, the tapped density means a value measured based on JIS R 1628:1997. The theoretical density is a density uniquely determined depending on the type of a substance. For example, when the powder material contains a plurality of substances, the theoretical density is a value naturally determined by the blending ratio of the plurality of substances.

The tapped density of the powder material can be adjusted by the following methods, for example: adjusting the porosity of particles constituting powder; a method for causing particles with various particle sizes to coexist; a method for mixing two or more types of powders with different particle diameters; a method for forming the particle shape into a spherical shape; and the like.

The ceramics and metals contained in the powder material for use in additive layer manufacturing of the present invention are not particularly limited. Examples of the ceramics include oxides, carbides, borides, nitrides, apatite, and the like. The metals may include simple substance metals, alloys, or a combination thereof. In particular, in order to obtain cermet as a molded article, the powder material may contain ceramics, such as high-hardness metal carbides, borides, nitrides, and oxides, and metals, such as cobalt, iron, chromium, molybdenum, and nickel, and alloys thereof. To obtain a cemented carbide, the powder material may contain bond metals of carbide ceramics, such as tungsten carbide, titanium carbide, and tantalum carbide, and cobalt, nickel, and the like.

Advantageous Effects of Invention

The use of the powder material of the present invention remarkably improves the hardness of a molded article to be obtained by the additive layer manufacturing method.

BRIEF DESCRIPTION OF DRAWINGS

FIG. 1 is a schematic view illustrating one embodiment of an apparatus for additive layer manufacturing.

DESCRIPTION OF EMBODIMENTS

The porosity of particles constituting a powder material for use in additive layer manufacturing according to one embodiment of the present invention may be 30% or less. By lowering the porosity, the tapped filling rate can be increased. The porosity is preferably 20% or less and may be 10% or less or 5% or less.

In the measurement of the porosity, 10 particles are randomly sampled from powder. The cross section of each particle is analyzed and the area of all pores present in this cross section is calculated. The porosity is determined by dividing the area by the area of the cross section.

The particle size range of the particles constituting the powder material can be appropriately set according to the type or conditions of an apparatus for use in additive layer manufacturing. For example, the particle size range of the particles constituting the powder material can be appropriately adjusted to be 0.1 to 150 μm, 15 to 75 μm, or 20 to 63 μm.

In the present specification, the particle size distribution of the powder material indicates the size (particle diameter) and the proportion (relative particle amount based on 100% of the total powder material) contained in a particle group constituting the powder material. The "particle size range" is an index indicating the width (spread) from the lower limit to the upper limit of the particle diameters of the powder material. The lower limit value of the particle size range in the present specification means that the proportion of particles having particle diameters equal to or smaller than the value in the powder material is 5% or less. The upper limit value of the particle size range means that the proportion of particles having particle diameters equal to or larger than the value in the powder material is 5% or less. The particle size distribution of the powder material can be measured by an appropriate particle size distribution meter according to the particle size of the powder material. For example, the particle size distribution is determined using a Ro-tap tester (see JIS R6002) or a measuring instrument employing a laser diffraction/scattering method. For example, the particle size range means that, in the case of a powder material having a particle size range of 5 to 75 μm, the proportion of particles having a particle diameter of 5 μm or less is 5% or less and the proportion of particles having a particle diameter of 75 μm or more is 5% or less.

The powder material for use in additive layer manufacturing according to one embodiment of the present invention may contain only a main powder or may contain a main powder and an additional powder. When the additional powder is contained, the content of the main powder is preferably equal to or larger than the content of the additional powder. The cross section porosity of the additional powder is preferably smaller than the cross section porosity of the main powder. Since the porosities of the main powder and the additional powder have such a relationship, the hardness of a molded article is further improved.

The particle size range of the main powder (in the case of secondary particles, the particle size range of the secondary particles) is not particularly limited and can be appropriately adjusted to 5 to 150 μm, 10 to 100 μm, 15 to 75 μm, or 20 to 63 μm, for example.

When the main powder constituting the powder material contains particles having such a form, the fluidity is significantly improved as compared with a powder material containing an aggregate of single raw material particles, which has been used in conventional additive layer manufacturing. In the case of particles in which raw material particles are monodispersed, which have been used in conventional additive layer manufacturing, the fluidity has tended to decrease with an increase in the contact area between the particles when the average particle diameter is small. As described above, even when the average particle diameter of the primary particles is small, the primary particles form secondary particles, and therefore good fluidity corresponding to the average particle diameter of the secondary particles can be obtained. A reduction in the average primary particle diameter of the main powder can produce effects that the surface roughness (Ra) of a three-dimensional molded article to be produced can be reduced and the dimensional accuracy is improved.

The main powder facilitates the entering of the additional powder between particles by increasing the pores between the particles. The additional powder may contain particles which have a small particle size and are possibly finest to fill the pores between the particles of the main powder with no gaps. Therefore, the additional powder may be particles which remain the primary particles described above and do not form secondary particles. The particle size range of the additional powder is not particularly limited and can be appropriately adjusted according to the particle size range of the main powder, e.g., 0.1 to 15 μm, 0.1 to 10 μm, 0.5 to 10 μm, or 1 to 5 μm.

Herein, the "primary particle" means the smallest unit which can be identified as a granular substance from the appearance among the morphological constituent components constituting the powder material. The "secondary particle" refers to a particle-like substance (one in a particle form) in which the primary particles are three-dimensionally bonded and integrally behave as one particle.

The term "bond" as used herein means that two or more primary particles are directly or indirectly connected to each other. For example, a bond between the primary particles by a chemical reaction, a bond where the primary particles attract each other by simple adsorption, a bond utilizing the anchor effect that allows an adhesive to enter irregularities of the surface of the primary particles, a bond of the primary particles utilizing an effect of attracting each other by static electricity, a bond in which the surfaces of the primary particles are melted and integrated, and the like are included.

In one embodiment of the present invention, when the particle diameter at an integrated value of 50% (Dv50) in the volume-based particle size distribution of the main powder is defined as A and the particle diameter at an integrated value of 50% (Dv50) in the volume-based particle size distribution of the additional powder is defined as B, the A/B is preferably 25 or less. When the A/B exceeds 25, the fluidity of the powder tends to deteriorate due to the aggregation of the additional powder. In the case of the main powder containing the secondary particles, when the average particle size of the primary particles constituting the main powder is defined as C, the C/B is preferably 1 or more and 3 or less. When the C/B falls in this range, the hardness of a molded article is further improved.

The A/B can be adjusted by adjusting the particle size distribution of each powder and changing the mixing ratio of each powder in the manufacturing of the main powder and the additional powder.

An article can be manufactured by the additive layer manufacturing method using the powder material of the present invention. In particular, the powder material of the present invention is suitable for manufacturing cemented carbides or cemented carbide tools.

Examples of the additive layer manufacturing method in this embodiment include beam irradiation systems, such as a laser metal deposition method (LMD), a select laser melting method (SLM), and an electron beam melting method (EBM), and an inkjet system of forming a joint layer of powder particles by jetting a binder (bonding agent) by inkjet.

Specifically, the laser metal deposition method is a technology of providing a powder material to a desired part of a structure, and then irradiating the desired part with a laser beam to melt and solidify the powder material to apply padding to the part. By utilizing this method, when a physical deterioration, such as wear, occurs in a structure, for example, padding can be applied to the deteriorated part or the like by supplying a material constituting the structure or a reinforcing material as a powder material to the deteriorated part, and then melting and solidifying the powder material.

The select laser melting method is a technology of molding a three-dimensional structure by repeating an operation of scanning a powder layer in which a powder material is deposited with a laser beam based on slice data created from a design drawing to melt and solidify the powder layer into a desired shape in each one cross section (one slice data) and laminating the powder layer. The electron beam melting method is a technology of molding a three-dimensional structure by selectively melting and solidifying the powder layer using an electron beam based on slice data created from 3D CAD data, followed by laminating. All the technologies include a step of supplying the powder material, which is a raw material of the structure, to a predetermined molding position. Particularly the select laser melting method and the electron beam melting method require a repetition of a flattening step of uniformly and thinly depositing a powder material in the entire lamination area where a structure is molded with a thickness corresponding to the thickness of one cross section. In the flattening step of the powder material, the fluidity of the powder material is an important parameter and greatly affects the finish of the three-dimensional molded article to be produced. In contrast, the powder material for use in additive layer manufacturing in the present invention has good fluidity, and thus can produce a three-dimensional molded article having a good finish.

<Method for Manufacturing Powder Material>

The powder material in this embodiment can be manufactured by a granulation sintering method, a melt pulverization method, or the like, but the present invention is not limited thereto.

The granulation sintering method is a method including granulating raw material particles into the form of secondary particles, and then sintering the granulated raw material particles to firmly bond (sinter) the raw material particles to each other. In the granulation sintering method, the granulation can be carried out utilizing a granulation method, such as dry granulation or wet granulation, for example. Specific examples of the granulation methods include a rolling granulation method, a fluidized bed granulation method, a stirring granulation method, a crushing granulation method, a melt granulation method, a spray granulation method, a microemulsion granulation method, and the like. Among the above, the spray granulation method is mentioned as a preferable granulation method. In particular, a bottom-spray fluidized bed granulation method is preferable from the viewpoint of obtaining particles having a low porosity.

According to the spray granulation method, the powder material can be manufactured by the following procedure, for example. More specifically, raw material particles having a desired composition are first prepared, and then the surface thereof is stabilized with a protective agent or the like as necessary. Then, the stabilized raw material particles are dispersed in an appropriate solvent together with a binder and spacer particles containing an organic material or the like contained as necessary, for example, to prepare a spray liquid. The dispersion of the raw material particles in the solvent can be carried out using a mixer, such as a homogenizer or a blade type stirrer, a disperser, or the like, for example. Then, the spray liquid is sprayed utilizing an ultrasonic sprayer or the like to form liquid droplets. Such liquid droplets are passed through a continuous furnace on an air stream, for example. Then, the liquid droplets are dried in a low temperature zone provided relatively upstream in the furnace while being transported in the continuous furnace so that solvent components are removed, and then fired in a high temperature zone provided relatively downstream in the furnace. At this time, the granulated raw material particles are sintered with each other at the contact points and sintered while almost maintaining the granulated shape. Therefore, the spray granulation method is suitable for manufacturing of a main powder containing particles in the form of secondary particles in which primary particles are bonded with gaps.

In an example of the melt pulverization method, a binder resin, raw material particles, and other additives are sufficiently mixed with a mixer, such as a Henschel mixer or a ball mill, the raw material particles are dispersed or dissolved in a solution where resins are compatibilized with each other by being melted and kneaded using a heat kneading machine, such as a heating roll, kneader, or extruder, and then the resultant substance is cooled and solidified, followed by pulverizing and classifying, so that a toner according to the present invention can be obtained. In the classification step, a multi-division classifier is preferably used in terms of production efficiency.

<Composition/Configuration>

The powder material contains metals, alloys, or mixtures thereof, together with ceramics. For example, cermet particles may be secondary particles in which primary ceramic particles and primary metal particles are bonded and three-dimensionally bonded with gaps obtained from a mixture of raw material particles containing ceramic particles and raw material particles containing metal particles. The composition of the raw material particles is not particularly limited. The raw material particles are materials which are appropriately selected according to a target powder material (secondary particles) to be manufactured and contain metals, alloys, ceramics, or mixtures thereof, for example.

The ceramics may be metal carbides, borides, nitrides, oxides, and the like, for example, to obtain cermets or cemented carbides as molded articles. The metals may be those containing metals, such as cobalt, iron, chromium, molybdenum, and nickel, or alloys thereof.

The ceramics may be, without being limited to the above, a ceramic material containing oxides or nonoxides, such as carbides, borides, nitrides, and apatite.

Herein, the oxides are not particularly limited and can be oxides of various metals. Examples of metal elements constituting oxide-based ceramics include one or more species selected from metalloid elements, such as B, Si, Ge, Sb, and Bi, typical elements, such as Mg, Ca, Sr, Ba, Zn, Al, Ga, In, Sn, and Pb, transition metal elements, such as Sc, Y, Ti, Zr, Hf, V, Nb, Ta, Cr, Mo, W, Mn, Fe, Co, Ni, Cu, Ag, and Au, and lanthanoid elements, such as La, Ce, Pr, Nd, Sm, Er, and Lu. Among the above, one or more species of elements selected from Mg, Y, Ti, Zr, Cr, Mn, Fe, Zn, Al, and Er are preferable.

More specifically, examples of the oxide-based ceramics include, for example, alumina, zirconia, yttria, chromia, titania, cobaltite, magnesia, silica, calcia, ceria, ferrite, spinel, zircon, nickel oxide, silver oxide, copper oxide, zinc oxide, gallium oxide, strontium oxide, scandium oxide, samarium oxide, bismuth oxide, lanthanum oxide, ruthenium oxide, hafnium oxide, vanadium oxide, niobium oxide, tungsten oxide, manganese oxide, tantalum oxide, terbium oxide, europium oxide, neodymium oxide, tin oxide, antimony oxide, antimony-containing tin oxide, indium oxide, tin-containing indium oxide, zirconium oxide aluminate, zirconium oxide silicate, hafnium oxide aluminate, hafnium oxide silicate, titanium oxide silicate, lanthanum oxide silicate, lanthanum oxide aluminum, yttrium oxide silicate, titanium oxide silicate, tantalum oxide silicate, and the like.

Examples of non-oxide ceramics include carbides, such as tungsten carbide, chromium carbide, vanadium carbide, niobium carbide, molybdenum carbide, tantalum carbide, titanium carbide, zirconium carbide, hafnium carbide, silicon carbide, and boron carbide, borides, such as molybdenum boride, chromium boride, hafnium boride, zirconium boride, tantalum boride, and titanium boride, nitrides, such as titanium nitride, silicon nitride, and aluminum nitride, composites, such as forsterite, steatite, cordierite, mullite, barium titanate, lead titanate, lead zirconatetitanate, Mn—Zn ferrite, Ni—Zn ferrite, and sialon, phosphorous compounds, such as hydroxyapatite and calcium phosphate, and the like. These substances may be used alone or in combination of two or more species thereof.

Examples of metals and alloys include cobalt (Co), aluminum (Al), aluminum alloys, iron (Fe), steel, copper (Cu), copper alloys, nickel (Ni), nickel alloys, gold (Au), silver (Ag), bismuth (Bi), manganese (Mn), zinc (Zn), zinc alloys, titanium (Ti), chromium (Cr), molybdenum (Mo), platinum (Pt), zirconium (Zr), and iridium (Ir), for example. These substances may be used alone or in combination of two or more species thereof.

<Method for Manufacturing Three-Dimensional Molded Article>

As a method for manufacturing a three-dimensional molded article by additive layer manufacturing using the powder material in the present invention, the following methods are mentioned, for example. FIG. 1 illustrates an example of a simplified view of an additive layer manufacturing apparatus for additive layer manufacturing. The additive layer manufacturing apparatus includes, as a rough configuration, a lamination area 10 which is a space where additive layer manufacturing is performed, stocks 12 storing a powder material, a wiper 11 assisting the supply of the powder material to the lamination area 10, and a solidification means (inkjet head, laser oscillator, or the like) 13 for solidifying the powder material. The lamination area 10 typically includes a molding space having an enclosed outer periphery below the molding surface and is provided with a lifting table 14 which can be lifted and lowered in the molding space. The lifting table 14 can be lowered by a predetermined thickness $\Delta t1$ and a target molded article is molded on the lifting table 14. The stocks 12 are arranged near the lamination area 10 and each are provided with a bottom plate (lifting table) which can be lifted and lowered by a cylinder or the like in a storage space having an enclosed outer periphery, for example. By the lift of the bottom plate, a predetermined amount of a powder material can be supplied (extruded) to the molding surface.

In such an additive layer manufacturing apparatus, a powder material layer 20 having the predetermined thickness $\Delta t1$ can be prepared by supplying the powder material layer 20 to the lamination area 10 in a state where the lifting table 14 is lowered by the predetermined thickness $\Delta t1$ from the molding surface. At this time, the molding surface is scanned by the wiper 11, so that the powder material extruded from the stocks 12 can be supplied onto the lamination area 10 and the surface of the powder material can be flattened to form a homogeneous powder material layer 20. Then, with respect to the formed powder material layer 20 as a first layer, for example, a heat source, a solidifying composition, and the like are applied only to a solidification area corresponding to slice data of the first layer via the solidification means 13 to sinter or bond, for example, the powder material into a desired cross-sectional shape, thereby enabling the formation of a powder solidified layer 21 as the first layer.

Thereafter, the lifting table 14 is lowered by the predetermined thickness $\Delta t1$ to supply the powder material again, and then the powder material is smoothed with the wiper 11 to form the powder material layer 20 as a second layer. Then, a heat source, a solidifying composition, and the like are given to a solidification area corresponding to slice data of a second layer of the powder material layer 20 via the solidification means 13 to solidify the powder material to form the powder solidified layer 21 as the second layer. At this time, the powder solidified layer 21 as the second layer and the powder solidified layer 21 as the first layer, which is a lower layer, are integrated to form a laminate up to the second layer.

Subsequently, by repeating a step of lowering the lifting table 14 by the predetermined thickness $\Delta t1$ to form a new powder material layer 20, and then giving a heat source, a solidifying composition, and the like via the solidification means 13 to form a required portion into the powder solidified layer 21, a desired three-dimensional molded article can be manufactured.

As the means for solidifying the powder material, for example, a method including jetting a composition for solidifying a powder material by inkjet or a method including applying heat by a laser to melt and solidify a powder material is selected, or, when a powder material has a photocurable property, irradiation with ultraviolet rays or the like is selected according to the photocurable property.

Specifically, when the means for solidifying a powder material is a laser, a carbon dioxide gas laser or a YAG laser can be preferably used, for example. When the means for solidifying a powder material is the jetting of a composition by inkjet, compositions containing polyvinylpyrrolidone, polyvinylalcohol, polyvinylbutyral, polyacrylic acid, polyacrylic acid derivatives, polyamide, and the like or compositions containing a polymerization initiator and the like are usable as an adhesive, for example. When a powder material having a photocurable property is used, an excimer laser (308 nm), a He—Cd laser (325 nm), and an Ar laser (351 to 346 nm) having an ultraviolet wavelength range are usable. When a visible light photocurable resin is used, an Ar laser (488 nm) and the like are usable. More specifically, according to the properties of a powder material to be used, an appropriate means for solidifying the powder material may be selected.

EXAMPLES

Hereinafter, examples relating to the present invention will be described but are not intended to limit the present invention to those described in the following examples.

Powder materials having a mixing ratio of a main powder and an additional powder shown in Table 1 below were prepared. In Examples 4 and 5 and Comparative Example 2, only the main powder was used and no additional powder was used.

TABLE 1

| Powder material | Main powder:Additional powder (Volume ratio) | Main powder Composition | Dv50 = A | Granulation method | Cross section porosity (%) | Additional powder Composition | Dv50 = B |
|---|---|---|---|---|---|---|---|
| Ex. 1 | 7:3 | WC/13.1% Co | 46.7 | Bottom-spray fluidized bed granulator | 2.3 | WC/10% Co | 4.24 |
| Ex. 2 | 7:3 | WC/13.1% Co | 46.7 | Bottom-spray fluidized bed granulator | 2.3 | WC/6.73% Co | 1.79 |
| Ex. 3 | 7:3 | WC/12.3% Co | 18.5 | Bottom-spray fluidized bed granulator | 1.8 | WC/6.73% Co | 1.79 |
| Ex. 4 | 10:0 | WC/13.1% Co | 46.7 | Bottom-spray fluidized bed granulator | 2.3 | — | — |
| Ex. 5 | 10:0 | WC/12.3% Co | 18.5 | Bottom-spray fluidized bed granulator | 1.8 | — | — |
| Ex. 6 | 7:3 | WC/12.5% Co | 20.6 | Spray drying granulator | 22.3 | WC/6.73% Co | 1.79 |
| Ex. 7 | 8:2 | WC/12.5% Co | 20.6 | Spray drying granulator | 22.3 | WC/6.73% Co | 1.79 |
| Comp. Ex. 1 | 6:4 | WC/12.5% Co | 20.6 | Spray drying granulator | 22.3 | WC/6.73% Co | 1.79 |
| Comp. Ex. 2 | 10:0 | WC/12.5% Co | 20.6 | Spray drying granulator | 22.3 | — | — |

| | Additional powder Manufacturing method | Cross section porosity (%) | A/B | Tapped density (g/cm$^3$) | Theoretical density (g/cm$^3$) | Tapped filling rate (%) | Output (W) | Scanning speed (mm/s) | Molded article relative density (%) |
|---|---|---|---|---|---|---|---|---|---|
| Ex. 1 | Melt pulverization method | 0 | 11.0 | 7.37 | 14.8 | 49.8 | 300 | 300 | 95.0 |
| Ex. 2 | Melt pulverization method | 0 | 26.1 | 7.26 | 14.9 | 48.8 | 300 | 300 | 94.5 |
| Ex. 3 | Melt pulverization method | 0 | 10.3 | 6.99 | 14.9 | 46.8 | 300 | 300 | 94.2 |
| Ex. 4 | | | — | 6.85 | 14.8 | 46.5 | 300 | 300 | 93.9 |
| Ex. 5 | | | — | 6.61 | 14.8 | 44.7 | 300 | 300 | 93.9 |
| Ex. 6 | Melt pulverization method | 0 | 11.5 | 6.22 | 14.9 | 41.7 | 300 | 300 | 93.3 |
| Ex. 7 | Melt pulverization method | 0 | 11.5 | 6.05 | 14.9 | 40.7 | 300 | 300 | 93.0 |
| Comp. Ex. 1 | Melt pulverization method | 0 | 11.5 | 5.91 | 15.0 | 39.5 | 300 | 300 | 92.3 |
| Comp. Ex. 2 | | — | — | 5.53 | 14.8 | 37.4 | 300 | 300 | 92.2 |

(Main Powder)

For each of main powders of Examples 1 to 7 and Comparative Examples 1 and 2, raw material particles containing tungsten carbide (WC) (average particle diameter of 2 μm) and raw material particles containing cobalt (Co) (average particle diameter of 2 μm) were formed into a slurry, followed by mixing with an attritor. Thereafter, the mixture was granulated using a continuous fluidized bed spray granulator (product name: "SPRUDE", manufacturer: OKAWARA MFG. CO., LTD.) in Examples 1 to 5 or using a spray drying granulator (spray dryer) in Examples 6 and 7 and Comparative Examples 1 and 2, followed by sintering, crushing, and classifying, to form a WC/12 mass % Co cermet powder material having an average particle diameter shown in Table 1. The average particle diameter of the raw material particles was measured using a laser diffraction/scattering type particle size meter (LA-300, manufactured by HORIBA, Ltd.).

(Additional Powder)

For each of additional powders of Examples 1 to 3, 6 and Comparative Example 1, raw material particles containing tungsten carbide (WC) and raw material particles containing cobalt (Co) were heated and melted, followed by cooling, to form solidified matter (ingot), and then the solidified matter was pulverized and classified to form a WC/10 mass % Co cermet powder material having an average particle diameter shown in Table 1.

(Volume-Based Dv50)

The obtained main powders and additional powders each were measured for the Dv50 particle size at an integrated value of 50% in the volume-based particle size distribution. The Dv50 particle size was measured using a laser diffraction/scattering particle size meter (LA-300, manufactured by HORIBA, Ltd.), and the obtained results are shown in Table 1 in which the Dv50 of the main powder is indicated as A and the Dv50 of the additional powder is indicated as B.

(Cross Section Porosity)

Table 1 shows the porosity of the obtained main powders and additional powders calculated from values obtained by observing the cross sections of randomly selected particles with a 500× electron microscope image, and then dividing the area of pores in the cross section by the total cross section area.

(Tapped Filling Rate)

The obtained main powders and additional powders were mixed, and the tapped density was measured according to JIS R 1628: 1997. The obtained tapped density (g/cm$^3$), the theoretical density (g/cm$^3$), and the tapped filling rate (%) obtained by dividing the tapped density by the theoretical density each are shown in Table 1. Specifically, the theoretical density was calculated by the following expression.

Theoretical density=[15.63 (WC density)×WC wt % in main powder+8.9 (Co density)×Co wt % in main powder]× wt % of main powder+[15.63 (WC density)×WC wt % in additional powder+8.9 (Co density)×Co wt % in additional powder]×wt % of additional powder <Manufacturing of Three-Dimensional Molded Article>

Using each powder material having the mixing ratio of the main powder and the additional powder shown in Table 1, a molded article was manufactured by irradiating flatly laid powder with a laser by ProXDMP200 (Product Name, manufactured by 3D Systems, Inc.) to melt layers one by one and repeating this step. At this time, the output was set to 300 W, the scanning speed was set to 300 mm/s, the pitch width was set to 0.1 mm, and the lamination thickness was set to 30 μm.

<Relative Density of Molded Article>

The relative density of each of the obtained molded articles is shown in Table 1 as a percentage of a value obtained by dividing the density by the Archimedes method by the theoretical density.

In Examples 1 to 7, the tapped filling rate of the powder materials was 40% or more, and the obtained modeled articles achieved the relative density of 93% or more. In contrast, in Comparative Examples 1 and 2, the tapped filling rate of the powder materials was less than 40% and the relative density of the obtained modeled articles was less than 93%.

The invention claimed is:

1. A powder material for use in additive layer manufacturing comprising:
    ceramics; and
    metals, wherein:
    a tapped filling rate defined by (tapped density/theoretical density)×100% is 44.7% or more;
    the powder material comprises a main powder and an additional powder, wherein the main powder and the additional powder are cermet or cemented carbide;
    the main powder has a particle size range of 5 to 150 μm and the additional powder has a particle size range of 0.1 to 15 μm; and
    a porosity of the main powder is 5% or less.

2. The powder material according to claim 1, wherein a porosity of the main powder is larger than a porosity of the additional powder.

3. The powder material according to claim 1, wherein when a particle diameter at an integrated value of 50% (Dv50) in a volume-based particle size distribution of the main powder is defined as A and a particle diameter at an integrated value of 50% (Dv50) in a volume-based particle size distribution of the additional powder is defined as B, A/B is 25 or less.

4. The powder material according to claim 1, wherein the powder material is used for manufacturing a cermet or a cemented carbide by the additive layer manufacturing.

5. The powder material according to claim 1, wherein the main powder and the additional powder are cermet powders comprising WC and Co.

* * * * *